United States Patent
Karpenman

(10) Patent No.: US 10,400,892 B2
(45) Date of Patent: Sep. 3, 2019

(54) METHOD, COMPUTER PROGRAM WHEN RUN ON A COMPUTER, COMPUTER READABLE MEDIUM AND CONTROL UNIT FOR CONTROLLING A MULTI-CLUTCH TRANSMISSION

(71) Applicant: VOLVO TRUCK CORPORATION, Göteborg (SE)

(72) Inventor: Fredrik Karpenman, Västra Frölunda (SE)

(73) Assignee: Volvo Truck Corporation, Göteborg (SE)

( * ) Notice: Subject to any disclaimer, the term of this patent is extended or adjusted under 35 U.S.C. 154(b) by 277 days.

(21) Appl. No.: 15/515,625

(22) PCT Filed: Nov. 20, 2014

(86) PCT No.: PCT/EP2014/025017
§ 371 (c)(1),
(2) Date: Mar. 30, 2017

(87) PCT Pub. No.: WO2016/078680
PCT Pub. Date: May 26, 2016

(65) Prior Publication Data
US 2018/0328486 A1 Nov. 15, 2018

(51) Int. Cl.
*F16H 61/688* (2006.01)
*F16H 3/12* (2006.01)
*F16H 61/04* (2006.01)

(52) U.S. Cl.
CPC .............. *F16H 61/688* (2013.01); *F16H 3/12* (2013.01); *F16H 61/04* (2013.01); *F16H 2061/047* (2013.01)

(58) Field of Classification Search
CPC .......... F16H 3/12; F16H 61/04; F16H 61/688; F16H 2061/047
See application file for complete search history.

(56) References Cited

U.S. PATENT DOCUMENTS

2002/0088291 A1\* 7/2002 Bowen ..................... B60K 6/52
74/339
2009/0260480 A1\* 10/2009 Toyoda .................. F16H 3/006
74/665 A (Continued)

FOREIGN PATENT DOCUMENTS

CN      1062783 A    7/1992
CN      2924171 Y    7/2007

(Continued)

OTHER PUBLICATIONS

Chinese Official Action (dated Dec. 21, 2018) for corresponding Chinese App. 201480083522.0.

(Continued)

*Primary Examiner* — Edwin A Young
(74) *Attorney, Agent, or Firm* — WRB-IP LLP

(57) ABSTRACT

A method for controlling a multi-clutch transmission of a vehicle includes activating the central synchronizer to the first active state, such that the speed of a first member of a tooth clutch, attempting to engage the tooth clutch to be engaged, and if the tooth clutch to be engaged is determined not to be fully engaged a predetermined period of time after an initiation of an engagement, the following steps are performed: activating the central synchronizer to the second active state such that the speeds of the two members of the tooth clutch to be engaged are slightly unsynchronized, and engaging the tooth clutch to be engaged.

9 Claims, 3 Drawing Sheets

(56) References Cited

U.S. PATENT DOCUMENTS

| | | | |
|---|---|---|---|
| 2012/0000743 A1 | 1/2012 | Wittkopp et al. | |
| 2012/0137806 A1* | 6/2012 | Moorman | F16H 61/0206 74/340 |

FOREIGN PATENT DOCUMENTS

| | | |
|---|---|---|
| CN | 101949430 A | 1/2011 |
| CN | 202188073 U | 4/2012 |
| CN | 102644701 A | 8/2012 |
| DE | 4122628 A1 | 1/1993 |
| EP | 0635389 A1 | 1/1995 |
| EP | 0688978 A2 | 12/1995 |
| EP | 2426383 A1 | 3/2012 |
| JP | H06280948 A | 7/1994 |
| JP | 2012237347 A | 6/2012 |
| JP | 2013513765 A | 4/2013 |
| WO | 97033103 A1 | 9/1997 |
| WO | 2011069530 A1 | 6/2011 |
| WO | 2011150947 A1 | 12/2011 |

OTHER PUBLICATIONS

Franke R: 11 Das Automatische Doppelkupplungsgetriebe Fuer Sechs Oder Acht Lastfrei. Ohne Antriebsunterbrechung Uno Ohne Verspannung Schaltbare GAENGE11 Atz Automobiltechnische Zeitschrift. Vieweg Publishing. Wiesbaden, DE. vol. 101. No. 5. May 1, 1999 (May 1, 1999). pp. 350-354.357. XP000828559. ISSN: 0001-2785 p. 3.

Japanese Official Action (dated Feb. 5, 2019) for corresponding Japanese App. 2017-527354.

Japanese Official Action (dated Sep. 26, 2018) for corresponding Japanese App. 2017-527354.

* cited by examiner

METHOD, COMPUTER PROGRAM WHEN RUN ON A COMPUTER, COMPUTER READABLE MEDIUM AND CONTROL UNIT FOR CONTROLLING A MULTI-CLUTCH TRANSMISSION

BACKGROUND AND SUMMARY

The invention relates to a method for pre-selecting a gear in a dual-clutch transmission of a utility vehicle, such that tooth-to-tooth situations readily are resolved.

The invention can be applied in heavy-duty vehicles, such as trucks, buses and construction equipment. Although the invention will be described with respect to a truck, the invention is not restricted to this particular vehicle, but may also be used in other vehicles such as buses and construction equipment and/or passenger cars.

Dual clutch transmissions have become increasingly common for personal cars as well as utility vehicles over the last years. A dual clutch transmission is commonly provided with a normally closed (engaged) and a normally open (disengaged) clutch. A spring mechanism is acting upon the normally closed clutch such that it engages if there is no active force holding the clutch open. For the normally open clutch, the spring mechanism acts upon the normally open clutch, such that it disengages if there is no active force holding the clutch closed. The clutches are normally operated by a pressure medium driven actuator. Pressure is built up in the system by a compressor; however during a standstill of the vehicle it can be that the pressure in the system is too low to control the clutches. The normally closed clutch is connected to a first input shaft and the normally open clutch is connected to a second input shaft.

Both the normally closed and normally open clutches are input clutches. Each input clutch is designated one set of gears. The input clutches connect the input shafts to the provider of mechanical energy (e.g. a combustion engine) in the vehicle. In a dual clutch transmission a gear is referred to as preselected when the input shaft used by the gear is in drive connection to the driven wheels, but the associated clutch is disengaged. An active gear is the gear on which the vehicle currently is driving.

To prepare for an up-coming gear shift, the preselected gear is changed before the actual gear shift. This is to enable power shifting or to shorten the power cut-off time during power cut-off shifts. Power shifting is when a gear is changed in the transmission and the combustion engine keeps traction power to the drive line. Power cut-off shift is when the power transfer is cut off between the traction source and the drive fine during shifting, e.g. normal shifting in a standard manual vehicle transmission.

A change of the preselected gear typically includes a synchronization step to enable the engagement of the tooth clutch for the engaging gear. For the engaging step there is always a certain probability to end up in a tooth-tooth situation for a certain time depending on the relative movement of the engaging parts.

Such a tooth-tooth situation can be solved by slightly engaging the open input clutch to create a relative movement between the two engaging parts of the tooth clutch. The actuation of the input clutch is a relative time consuming operation and also causes a delay of the actual gear shifting.

It is desirable to provide a method for controlling a multi-clutch transmission of a vehicle, which method solves or reduces the above mentioned problem.

By the provision of the method which is adapted for a multi-clutch transmission comprising;

a first input shaft, a second input shaft, a first shaft, and a second shaft, at least a first and second tooth clutch arranged upon different shafts, chosen among; said first input shaft, said second input shaft, said first shaft and said second shaft wherein each of said first and said second tooth clutch is provided with a first and a second member respectively, wherein said first and said second member are in drive connection with one of said first and said second input shaft respectively, and a central synchronizer (70) provided with a first and a second active state (d1; d2) for increasing or decreasing a speed of the one of the first and second input shaft (12, 13) which is not transferring torque, depending of which of said first and said second state (d1; d2) said central synchronizer is provided in.

A drive connection is defined as two parts that are in connection with each other, such that a drive force/torque can be transferred between the two parts, either directly or indirectly over one or several intermediate parts. A drive connection does not have to be permanent, but can be achieved through engagement of one or several couplings or clutches between the two parts. The tooth clutches can be directly arranged upon the shafts and gearwheels or via any form of connection part. Further a tooth-clutch comprises at least a first and a second member, which are arranged to be engaged with each other in order to enable a drive connection between two parts in the transmission.

The central synchronizer is arranged to speed up or speed down the one of the input shafts, which is not transferring torque, by using the speed of the input shaft, which is transferring torque. The respective input shaft is synched down or synched up relative to the speed of the other input shaft, depending on which shaft is driven and which active state the central synchronizer is arranged in. There are different arrangements of a central synchroniser in order to achieve the two active states. In one exemplary embodiment of the central synchroniser, the first and the second active state directions of the central synchronizer are directed in a first and a second direction, opposite to each other.

Because the not torque transferring input shaft still can be in drive connection with a member of a tooth clutch to be engaged, the central synchronizer can be used to synchronize and desynchronize the first and the second member of a tooth clutch.

Now, the first and the second tooth clutches can be arranged in an engaged and a disengaged position, whereby in said engaged position the first and the tooth clutches enable a drive connection between the part its first member is arranged upon and a part its second member is arranged upon. The parts being engaged by the tooth clutch can be a shaft with another shaft or a shaft with a gearwheel or a gearwheel with another gearwheel, or any other combination of two rotating members in the multi-clutch transmission. In the disengaged position of the tooth clutch, the two parts of the transmission provided with respective member of the tooth clutch are disconnected from each other, i.e. not in drive connection, whereby a drive connection is disabled. A gearwheel is normally one member in a gear step, gearwheel pair, gear set or gear stage.

According to the method, during a gear shifting procedure from a currently engaged gear to a predicted gear; the method comprises the steps of:

activating said central synchronizer in to a first active state, such that the speed of the first member of a tooth clutch to be engaged is synchronized with a speed of the second member of said tooth clutch corresponding to said predicted gear, attempting to engage said tooth clutch, and if the tooth clutch is determined not to be fully engaged a predetermined period of time after an initiation of an engagement, the following steps are performed:

activating the central synchronizer to the second active state such that the speeds of the first and the second member of the tooth clutch are slightly unsynchronized, and re-engaging the tooth clutch to be engaged.

Normally the actuating force is kept upon the tooth clutch during the whole procedure, whereby the tooth clutch engages immediately, when the two members of the tooth clutch are unsynchronized.

The method according to the invention enables elimination of a tooth to tooth situation, which prevents an engagement of a tooth clutch, by achieving a speed difference in the synchronized revolutions of the members of the tooth clutch to be connected.

The method can preferably be used during a gear shifting procedure of pre-selected gears, when a new pre-selection of a gear is made. E.g. directly after a performed change of active drive gear or when another pre-selection is desired.

In the application the terms active gear, predicted gear and pre-selected gear will be used. All these terms describe different states of a gear, whereby any gear can be in either of these states, however, only one gear can be in each state at any given time. An active gear is the gear that momentarily is transferring torque from the transmission input to the transmission output. The predicted gear, is the gear which is predicted to be the next active gear and the pre-selected gear is the gear which is pre-selected in the none active part transmission.

In one exemplary embodiment, the method is applied upon a dual clutch transmission, provided with a first and a second input shaft and said first shaft is a main shaft and said second shaft is a countershaft and the tooth clutches are arranged upon the main shaft and the countershaft respectively. The dual clutch transmission is further provided with a central synchroniser, which is displaceable in two opposite directions, corresponding to the first and second active state. In this exemplary embodiment the predicted gear is a third gear, whereby the first tooth clutch is arranged upon the first shaft and is connecting a gearwheel with the first shaft, whereby the first and the second member of the tooth clutch are associated with either of the first shaft and the gearwheel respectively. Normally, during an acceleration phase, when the third gear is predicted a second gear is active and a first gear is or just has been pre-selected. When a third gear is predicted, the pre-selected gear should be changed from the first to the third gear.

In another exemplary embodiment of the method still applied upon a dual clutch transmission, provided with a first and a second input shaft and said first shaft is a main shaft and said second shaft is a countershaft and the tooth clutches are arranged upon the main shaft and the countershaft respectively. The dual clutch transmission is further provided with a central synchroniser, which is displaceable in two opposite directions, corresponding to the first and second active state. In this exemplary embodiment of the method the predicted gear is a sixth gear, whereby the first tooth clutch arranged to connect two gearwheels rotatably arranged adjacent to each other upon the second shaft. The active gear is normally thereby a fifth gear and the predicted gear changes from the fourth gear to the sixth gear, while the vehicle is driving on the fifth gear.

The method can also be applied during a gear shifting procedure changing active gear, e.g., when the vehicle is driving on a first gear and changes to drive upon a second gear.

In another exemplary embodiment of the method still applied upon a dual clutch transmission, provided with a first and a second input shaft and said first shaft is a main shaft and said second shaft is a countershaft and the tooth clutches are arranged upon the main shaft and the countershaft respectively. The dual clutch transmission is further provided with a central synchroniser, which is displaceable in two opposite directions, corresponding to the first and second active state. In this exemplary embodiment of an example of use of the method during a gear shifting procedure changing directly from one active gear to another active gear (which has not been preselected) is given. A momentarily active gear is a second gear, and a preselected gear is a third gear, wherein during a gear shifting procedure from the momentary active gear to a fifth gear, the following is performed;

controlling a first tooth clutch upon a first shaft to a neutral position, in order to disengage said second gear, activating said central synchronizer in a first direction, such that the speed of a first member of the tooth clutch to be engaged is synchronized with a speed of a second member of the tooth clutch to be engaged, whereby the first and the second members are arranged upon an adjacent gearwheel corresponding to said predicted gear, attempting to engage said tooth clutch to be engaged with said gearwheel (in order to make said fifth gear active), and if the tooth clutch is determined not to be fully engaged a predetermined period of time after an initiation of an engagement, the following steps are performed:

activating the central synchronizer in the second direction such that the speeds of the two members of the tooth clutch to be engaged are slightly unsynchronized, and re-engaging the tooth clutch to be engaged.

Normally the pressure is kept upon the tooth clutch during the whole procedure, whereby the tooth clutch engages immediately, when the tooth clutch and the gearwheel are unsynchronized.

In an exemplary embodiment the first shaft is a main shaft and the second shaft is a countershaft.

In other exemplary embodiments of the method, the method is applied upon a transmission provided with tooth clutches provided upon one or both of the input shafts. The tooth clutches provided upon the input shaft can be synchronised and desynchronised according to the method disclosed.

In other exemplary embodiment of the method, the method is applied upon a transmission provided with a central synchroniser, provided as a first and a second part central synchroniser, where the first part central synchroniser represents the first active state of the central synchronizer and the second part central synchroniser represents the second active state of the central synchroniser.

As disclosed the method can be applied upon dual-clutch transmissions with different configurations, independently on the specific layout of the central synchronizer or upon which shaft the tooth clutches are arranged.

The method is preferably performed by a computer program comprising program code means, wherein said program is run on a computer.

The computer program is preferably carried on a computer readable medium, wherein the program is run on a computer.

A control unit is preferably provided for controlling a utility vehicle, the control unit being configured to perform the steps of the method.

Further advantages and advantageous features of the invention are disclosed in the following description and in the dependent claims.

BRIEF DESCRIPTION OF THE DRAWINGS

With reference to the appended drawings, below follows a more detailed description of exemplary embodiments of the method cited as examples.

In the drawings.

DETAILED DESCRIPTION OF EXAMPLE EMBODIMENTS OF THE INVENTION

Figure 1:
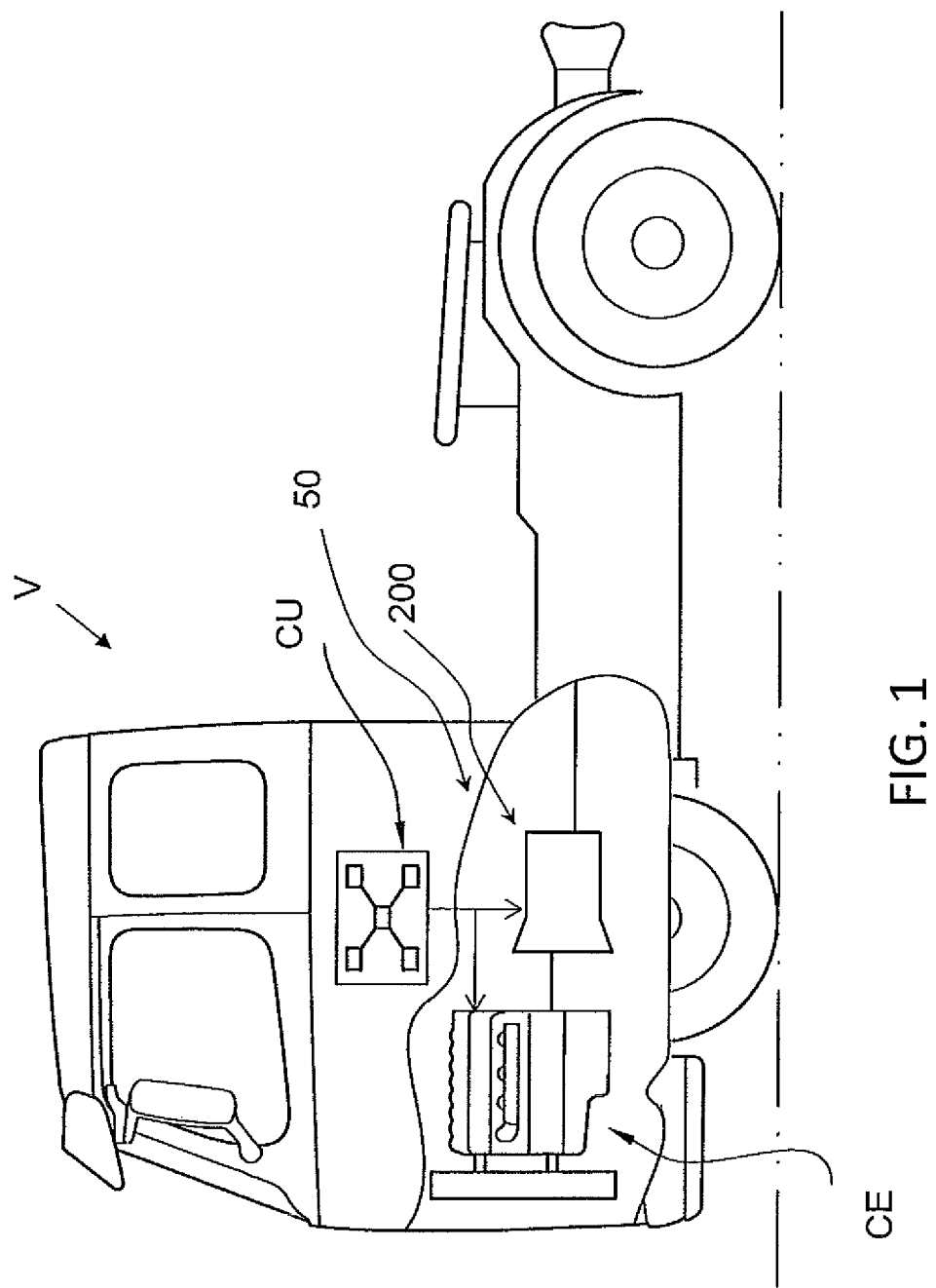
FIG. 1 shows a schematic drawing of a vehicle.

FIG. 1 discloses a schematic view of a vehicle V, such as a truck, comprising a drivetrain 50 with a combustion engine CE and a transmission 200 and a control unit CU for controlling the drivetrain 50 and the different components thereof of the vehicle V.

Figure 2:
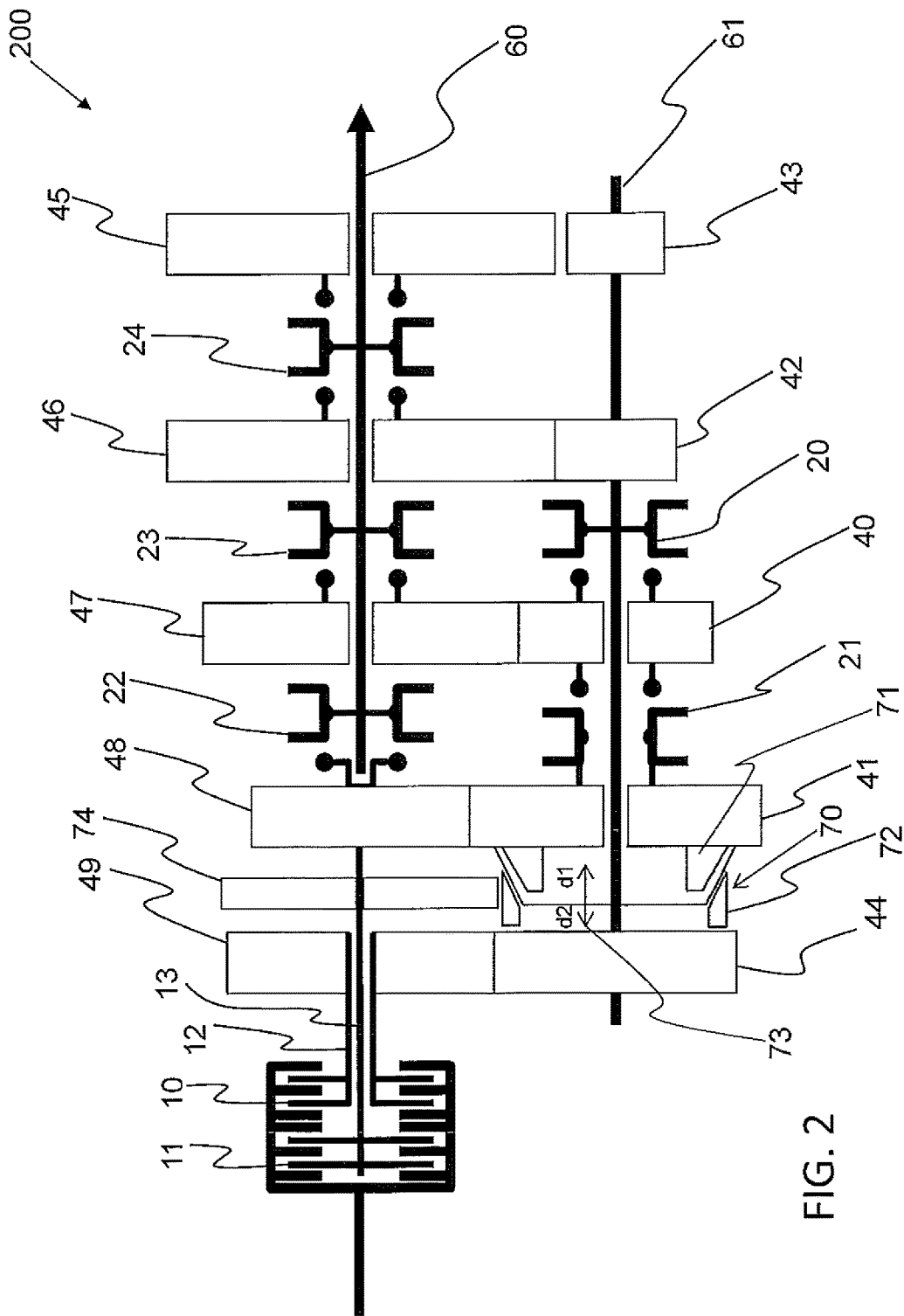
FIG. 2 shows a schematic drawing of a transmission.

FIG. 2 discloses an example of a dual clutch transmission 200 which can be controlled according to the present method. As in the disclosed example, a transmission suitable to control with the method is provided with tooth clutches 20, 21, 22, 23, 24 which are or can be in drive connection with at least one of two input clutches 10, 11. In the description references are made to tooth clutches 20, 21, 22, 23, 24, wherein all tooth clutches 20, 21, 22, 23, 24 are provided with a first and a second member. By engaging the first and the second member of a tooth clutch 20, 21, 22, 23, 24, the tooth clutch 20, 21, 22, 23, 24 is engaged and a drive connection between a part upon which the first member of the tooth clutch 20, 21, 22, 23, 24 is arranged and the part upon which the second member of the tooth clutch 20, 21, 22, 23, 24 is arranged is established.

The dual-clutch transmission 200 can for example be provided with a normally closed input clutch 10 and a normally open input clutch 11, which both are arranged to be connected to a combustion engine CE (disclosed in FIG. 1). The dual clutch transmission 200 is provided with a first input shaft 12 connected to the normally closed input clutch 10 and a second input shall 13 connected to the normally open input clutch 11. It should be noted that the invention can be implemented in dual clutch transmissions having other clutch configurations; such as both clutches 10 and 11 being normally closed or both clutches 10 and 11 being normally open, or instead clutch 10 being normally open and clutch 11 being normally closed. The transmission 200 is further provided with a main shaft 60, a countershaft 61 and a plurality of gearwheels 40-48, which are rotatably or fixedly arranged upon the shafts 12, 13, 60, 61 of the transmission 200. Tooth clutches 20-24 are provided to connect the rotatably arranged gearwheels 40, 45, 46, 47 with a shaft 60, 61 in order to establish a drive connection between the shaft 60, 61 and the gearwheel 40, 45, 46, 47, alternatively the tooth clutch 21 establishes a drive connection between the two gearwheels 40 and 41, and the tooth clutch 22 establishes a drive connection between the main shaft 60 and the second input shaft 13/the gearwheel 48.

During a gear change procedure, independently if, an active drive gear is changed or a pre-selected gear is changed, the tooth clutches 20-24 can get stuck in a tooth to tooth situation when there is a synchronous speed between the first member of the tooth clutch 20-24 and the second member of the tooth clutch 20-24. Now, the present invention solves these situations by controlling the central synchronizer 70.

The central synchronizer 70 is in the embodiment disclosed arranged essentially upon the countershaft 61. However, other designs of the central synchronizer are also compatible with the method. The disclosed central synchronizer comprises a first friction part 71, a second friction part 72, a connection part 73 and a gearwheel 74, which is arranged upon the second input shaft 13. The first friction part 71 is a part of or fixedly arranged upon the gearwheel 41. The second friction part 72 is provided with gear teeth, which mesh with the gear teeth of gearwheel 74. The connection part 73 is rotationally fixed and axially displaceably arranged upon the countershaft 61. The connection part 73 can be displaced in a right and a left direction d1, d2 (left and right refer to left and right in the FIG. 2).

By displacing the connection part 73 in the right direction d1, the connection part 73 engages with the first friction part 71, whereby the connection part 73 is synchronized with the first friction part 71 and thereby with the gearwheel 41. Now, the first and the second input shaft 12, 13 are connected over the input gearwheel 49 of the first input shaft 12, the input gearwheel 44 of the countershaft 61 and over the input gearwheel 48 of the second input shaft 13 and the first input gearwheel 41 of the countershaft.

By displacing the connection part 73 in the left direction d2, the connection part 73 engages with the second friction part 72, whereby the connection part 73 is synchronized with the second friction part 72. Now, the first and the second input shafts 12, 13 are connected over the input gearwheel 49 of the first input shaft 12, the second input gearwheel 44 of the countershaft 61 and the central synchronizer 70 over its gearwheel 74 upon the second input shaft 13.

Depending on the direction of displacement of the connection part 73, a different gear ratio is achieved between the first and the second input shafts 12, 13, due to the difference in gear ratio between the gear steps; gearwheel 74 upon second input shaft 13—second friction part 72, and input gearwheel 48 of first input shaft 13—first friction part 71 (i.e. first input gearwheel 41 of countershaft 61). It is this difference in gear ratio that is used in the presented method in order to resolve any tooth to tooth situation occurring during a gear change procedure.

Figure 3:
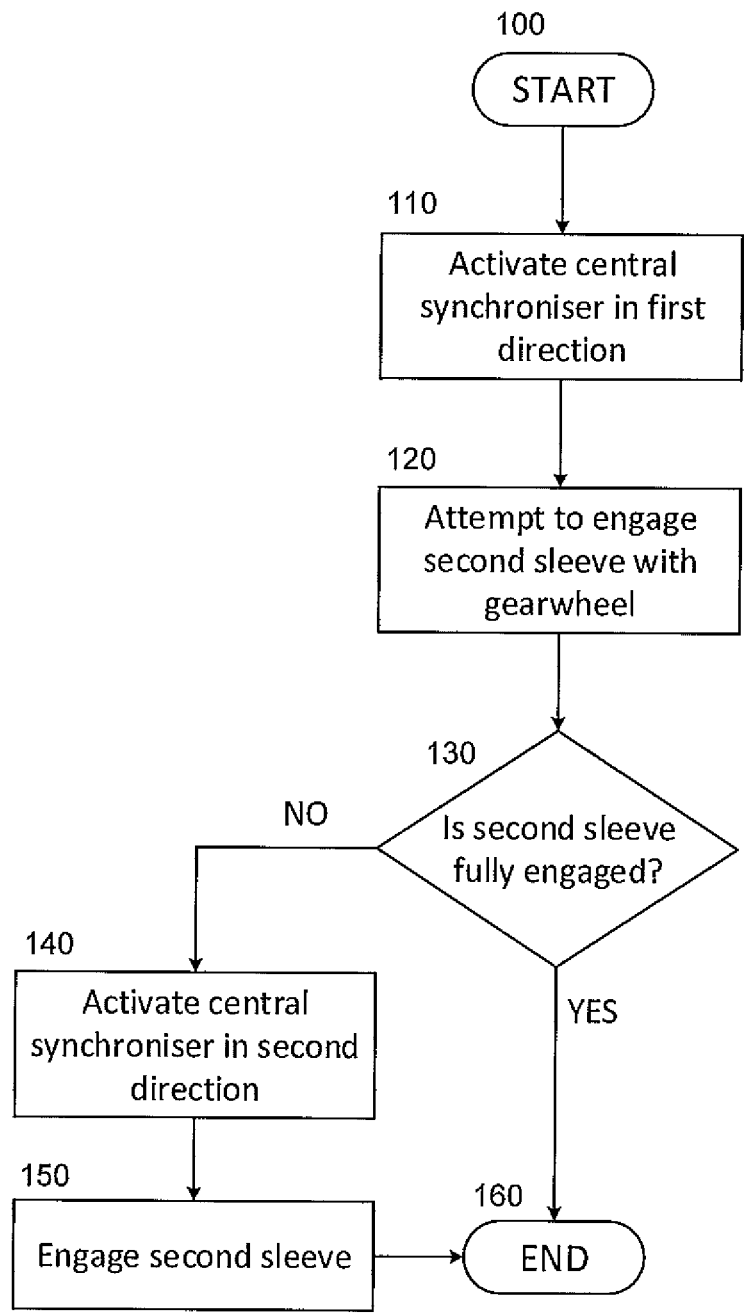
FIG. 3 shows a schematic flow chart of the method.

Now, in FIG. 3, the suggested method to control a multi-clutch transmission 200 is described. The method starts 100, when a gear-shift procedure is in a phase where any of the tooth clutches 20, 21, 22, 23, 24 are to be engaged. The central synchronizer 70 is activated 110 in a first direction d1, d2 in order to achieve synchronization between the two members of the tooth clutch 20, 21, 22, 23, 24 to be engaged.

Now, if a vehicle V provided with the transmission 200 is driving in a second gear after having been driving in the first gear, torque is transferred from the combustion engine CE over the normally closed clutch 10 and the first input shaft 12, the gear step 49-44 to the countershaft 61, the gear step 42-46 to the main shaft 60, from which the torque is outputted. To achieve the second gear, the tooth clutch 24 must be engaged to the left in the figure, thereby putting the gearwheel 46 in drive connection with the main shaft 60. When the first gear is pre-selected, tooth clutches 20 and 21 need to be engaged as well.

When the third gear has become the predicted gear, the pre-selected gear will be changed from first to third gear. To pre-select the third gear, the tooth clutch 23 is to be engaged to connect the gearwheel 47 with the main shaft 60. However, the first step is to disengage the tooth clutch 20 in order not to have the first gear pre-selected. When the method starts, the central synchronizer 70 is activated in a first direction, which in this case is the direction d2, in order to speed the gearwheel 47 down to synchronise the members of the tooth clutch 23. When the members of the tooth clutch 23 have reached synchronized speed, an engagement of the tooth clutch 23 with the gearwheel 47 is attempted 120. Now ideally the tooth clutch 23 is engaged 130, whereby the method ends 160. However, if it is determined that the tooth clutch 23 has not been fully engaged 130 a predetermined period of time after the initiation of the attempt to engage the tooth clutch 23; it is assumed that the coupling teeth of the members of the tooth clutch 23 are stuck tooth to tooth.

The central synchronizer 70 is therefore activated 140 in a second direction, which in this case is the direction d1, in order to initiate a desynchronization between the members of the tooth clutch 23, in order to achieve a slight movement between the members of the tooth clutch 23, such that the tooth to tooth situation is solved. The tooth clutch 23 is engaged 150 immediately thereafter. Normally, a clutch actuator (not shown) keeps the actuating force upon the tooth clutch 23, such that it engages immediately after a desynchronization is initiated between the members of the tooth clutch 23. The engagement will be 100% successful, because of the slight desynchronization between the two members of the tooth clutch 23 initiated by the activation of the central synchronizer 70 in the second direction d1.

The method is implemented in the same manner, independently of from which gear change it is made. For example, if a vehicle V provided with the transmission 200 is driving in a fifth gear after have been driving in the fourth gear, torque is transferred from the combustion engine CE over the normally open clutch 11 and the second input shaft 13, directly to the main shaft 60 over the engaged tooth clutch 22, whereby the torque is outputted to the drive train from tire main shaft 60.

Now, the fourth gear is preselected, since this is the last driving gear of the vehicle V. To enable the fourth gear, the tooth clutch 20 and tooth clutch 23 are engaged. In an acceleration phase of the vehicle, the next driving gear would be the sixth gear. The sixth gear is realised, in that torque is transferred from the combustion engine CE over the normally closed clutch 10 and the first input shaft 12, the gear step 49-44, the tooth clutch 20, gearwheel 40, tooth clutch 21 connecting gearwheel 40 with gearwheel 41, the gear step 41-48 and thereafter to the main shaft 60 over the engaged tooth clutch 22, whereby the torque is outputted to the drive train from the main shaft 60.

To achieve a gearshift of preselected gear from the fourth gear to the sixth gear, which thereby is a predicted gear, the tooth clutch 23 is to be disengaged, so that the gearwheel 47 is disconnected from the main shaft 60, this step disengages the fourth gear. To preselect the sixth gear, according to the method; the method starts 100 and the central synchronizer 70 is activated 110 in a first direction, which in this case is the direction d1, in order to speed the gearwheel 41 down to be able to synchronize the two members of the tooth clutch 20, arranged upon the gearwheels 41 and 40 respectively. When the members of the tooth clutch 20 have reached synchronized speed, an engagement 120 of the tooth clutch 20 is attempted. Now ideally the tooth clutch 20 is engaged 130 and there is a drive connection between the gearwheel 40 and the countershaft 61, whereby the method ends 160. However, if it is determined that the tooth clutch 20 not has been fully engaged 130 a predetermined period of time after the initiation of the attempting to engage the tooth clutch 20; it is assumed that the two members of the tooth clutch 20 are stuck tooth to tooth.

The central synchronizer 70 is therefore activated 140 in a second direction, which in this case is the direction d2, in order to initiate a desynchronization between the two members of the tooth clutch 20. By activating 140 the central synchronizer 70 in the second direction d2, the speed of the countershaft 61 and thereby the speed of a first member of the tooth clutch 20 is slightly increased, whereby the tooth to tooth situation is solved. The tooth clutch 20 can be engaged 150 immediately thereafter and the method ends 160. The engagement will be 100% successful, because of the slight desynchronization between two members of the tooth clutch 20 initiated by the activation of the central synchronizer 70 in the second direction d2 will assure that no tooth to tooth blocking will occur.

In the above two examples the method has been used in a gear change procedure when changing from one preselected gear to another preselected gear. The method can however also be used for a direct gear change of one active gear to another active gear. E.g. the vehicle V with the transmission 200 can be driven on the fourth gear and perform a power cut-off gear change procedure directly to the sixth gear by using the method as described above, with the only difference that both the normally closed and the normally open input clutch 10, 11 thereby are opened simultaneously in order to perform the gear shift.

It is to be understood that the present invention is not limited to the embodiments described above and illustrated in the drawings; rather, the skilled person will recognize that many changes and modifications may be made within the scope of the appended claims. The method can especially be applied to dual-clutch transmissions, independently of upon which shafts the tooth clutches to be synchronised/desynchronised are arranged and the specific layout of the central synchroniser.

The invention claimed is:

1. A method for controlling a multi-clutch transmission of a vehicle, the multi-clutch transmission comprising:
    a first input shaft, a second input shaft, a first shaft, and a second shaft,
    at least a first and second tooth clutch arranged upon different shafts among; the first input shaft, the second input shaft, the first shaft and the second shaft, wherein each of the first and second tooth clutch is provided with a first and a second member respectively, wherein the first and the second member are in drive connection with one of the first and second input shaft respectively,
    a central synchronizer provided with a first active state and a second active state for increasing or decreasing a speed of the one of the first and second input shaft which is not transferring torque, depending of which of first and second active statea the central synchronizer is provided in,
    wherein the first and second tooth clutches can be arranged in an engaged and a disengaged position, whereby in the engaged position the first and second tooth clutch enables an operative connection between the first and second member of the tooth clutch and in the disengaged position the operative connection is disabled,
    wherein during a gear shifting procedure from a momentary gear to a predicted gear; the method comprises the steps of:

activating the central synchronizer to the first active state, such that the speed of a first member of a tooth clutch to be engaged is synchronized with a speed of a second member of a tooth clutch, attempting to engage the tooth clutch to be engaged, if the tooth clutch to be engaged is determined not to be fully engaged a predetermined period of time after an initiation of an engagement, the following steps are performed:

activating the central synchronizer to the second active state such that the speeds of the two members of the tooth clutch to be engaged are slightly unsynchronized, and engaging the tooth clutch, to be engaged.

2. The method according to claim 1, wherein the method is used during a gear shifting procedure of pre-selected gear.

3. The method according to claim 2, wherein the predicted gear is a third gear, the tooth clutch is a first tooth clutch provided with one member upon the first shaft and is connecting a gearwheel with the first shaft.

4. The method according to claim 2, wherein the predicted gear is a sixth gear, the tooth clutch to be engaged is a second tooth clutch connecting a gearwheel arranged upon the second shaft and in its engaged position connecting two gearwheels rotatably arranged upon the second shaft.

5. The method according to claim 1, wherein the method is used during a change of an active gear.

6. The method according to claim 1, wherein the first shaft is a main shaft and the second shaft is a countershaft.

7. A computer comprising a computer program for performing the steps of claim 1 when the program is run on the computer.

8. A non-transitory computer readable medium carrying a computer program comprising program code means for performing the steps of claim 1 when the program product is run on a computer.

9. A control unit for controlling a utility vehicle, the control unit being configured to perform the steps of the method according to claim 1.

* * * * *